US007120133B1

(12) United States Patent
Joo et al.

(10) Patent No.: US 7,120,133 B1
(45) Date of Patent: Oct. 10, 2006

(54) SYSTEM AND METHOD OF LINKING A WIRELESS SIGNALING PROTOCOL WITH A MEDIA GATEWAY CONTROL PROTOCOL IN A PACKET-BASED NETWORK

(75) Inventors: Ki-Hyun Joo, San Jose, CA (US); Chol Su Kang, Fremont, CA (US); Sung Goo Shim, San Jose, CA (US); Jay Wu Hong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 09/706,240

(22) Filed: Nov. 3, 2000

(51) Int. Cl.
*H04L 12/66* (2006.01)
*H04B 7/216* (2006.01)

(52) U.S. Cl. ...................... 370/328; 370/335; 370/338; 370/352

(58) Field of Classification Search ................ 370/352, 370/353, 356, 335, 342, 328
See application file for complete search history.

(56) References Cited

U.S. PATENT DOCUMENTS

| 5,623,495 | A | * | 4/1997 | Eng et al. ............... 370/397 |
| 5,956,331 | A | * | 9/1999 | Rautiola et al. ........... 370/338 |
| 6,295,457 | B1 | * | 9/2001 | Narayanaswamy ......... 455/466 |
| 6,377,799 | B1 | | 4/2002 | Hameleers et al. ......... 455/426 |
| 6,434,140 | B1 | | 8/2002 | Barany et al. ............. 370/352 |
| 6,542,497 | B1 | * | 4/2003 | Curry et al. ............... 370/352 |
| 6,680,922 | B1 | * | 1/2004 | Jorgensen .................. 370/328 |
| 6,680,952 | B1 | | 1/2004 | Berg et al. ................ 370/467 |
| 6,681,252 | B1 | | 1/2004 | Schuster et al. ........... 709/227 |
| 2001/0022784 | A1 | * | 9/2001 | Menon et al. ............. 370/352 |
| 2001/0043577 | A1 | * | 11/2001 | Barany et al. ............. 370/328 |
| 2002/0089998 | A1 | * | 7/2002 | Le ........................ 370/465 |

OTHER PUBLICATIONS

Arango, et al; IETF Request for Comments 2705 "Media Gateway Control Protocol (MGCP) Version 1.0"; Oct. 1999; Internet Engineering Task Force.*

* cited by examiner

*Primary Examiner*—Seema S. Rao
*Assistant Examiner*—Robert C. Scheibel, Jr
(74) *Attorney, Agent, or Firm*—Baker Botts L.L.P.

(57) ABSTRACT

A wireless office communication system including a multi-protocol wireless internet base station (WIBS) encompassing a base station controller (BSC), a mobile switch controller (MSC) and an ethernet interface module for coupling the WIBS to an existing internet protocol (IP) based network. The interface module provides for coupling the WIBS to an ethernet back-bone, a mobile communication unit and a public switch telephone network (PSTN). In one embodiment the wireless communication system includes wireless signaling logic and media gateway logic to enable the wireless office communication system to handle signal transmission between a mobile terminal and a media gateway. A virtual circuit identity code (VCIC) enables the base station to provide a virtual traffic path (VTP) to link communications between TIA/EIA-634 wireless signaling and media gateway control protocol (MGCP).

8 Claims, 3 Drawing Sheets

SYSTEM AND METHOD OF LINKING A WIRELESS SIGNALING PROTOCOL WITH A MEDIA GATEWAY CONTROL PROTOCOL IN A PACKET-BASED NETWORK

TECHNICAL FIELD OF THE INVENTION

The present invention relates generally to the field of wireless communication systems. More particularly, the present invention relates to packet-based wireless base stations which interface with Call Agents using wireless signaling protocol for call signaling and Media Gateway Control Protocol for media gateways.

BACKGROUND OF THE INVENTION

Local area networks such as Ethernet are well known. Most local area networks are wired, so that each station is coupled directly or indirectly to all other stations by cabling or wires, thus providing full connectivity between all stations. Such local area networks avoid collisions and achieve efficient use of the communications channel by well known carrier sensing and collision avoidance schemes. Such schemes are typically not suitable for wireless networks. Communication systems that utilize coded communication signals are well known in the art. One such system is a code division multiple access (CDMA) cellular communication system such as the one set forth in the Telecommunications Industry Association/Electronic Industries Association International Standard (TIA/EIA IS-95), hereinafter referred to as IS-95.

In accordance with the IS-95, the coded communication signals used in CDMA systems comprise CDMA signals that are transmitted in a common 1.25 MHz bandwidth. The signals may be communicated to base stations of the system from mobile or wireless communication units, such as cell phones, or portable wireless computers, and wireless handheld devices that are communicating in a specific coverage area of the base station. In conventional CDMA systems, the base station communicates with a base station controller (BSC) that allows each communication unit to communicate with other communication units within the same coverage area. Each CDMA signal includes a pseudo-noise (PN) sequence associated with a particular base station and an identification number of a communicating communication unit.

Typically, the BSC is coupled to a mobile switching controller (MSC). This allows a base station to connect with other base stations outside its coverage area in order to allow a communicating communication unit to communicate with other units outside its coverage area.

FIG. 1 is an illustration of a conventional prior art CDMA system. In the system shown in FIG. 1, base stations 110 and 120 are coupled to a BSC 130 and a MSC 140. MSC 140 is in turn coupled to the public switched telephone network (PSTN) 150 using known techniques.

In the system shown in FIG. 1, when a communication unit initiates a call sequence to either one of the base stations 110 and 120 within a coverage area, an end-to-end connection is established between the respective base stations, the BSC 130 and the MSC 140 using known CDMA call setup techniques. The base stations 110 and 120 typically communicate with the BSC 130 and the MSC 140 via communication links, such as a T1 connection. Base stations 110 and 120 typically have antennas to define the coverage area within which either base stations primarily accommodate the communication units.

With the proliferation of wireless devices in the office and school environment, the communication system shown in FIG. 1 can be very expensive if implemented in an office or in-building environment. The system in FIG. 1 also has the inherent problem of wireless voice and data signal quality degradation if implemented in an in-building environment.

To alleviate the problems of the system shown in FIG. 1 and with the advent of enterprise based wireless networks, some prior art CDMA systems implement the system shown in FIG. 2. In the system illustrated in FIG. 2, a wireless base station is coupled to existing ethernet network infrastructure to enable the CDMA system to utilize existing internet protocol techniques to allow communication between wireless devices coupled to the ethernet network.

The system in FIG. 2 utilizes a combination of wireless signaling protocol and media gateway protocol to allow wireless call handling and other multi-media data transmission. A wireless signaling protocol may be used to handle mobile terminals.

Despite the robustness of the system in FIG. 2, an in-building wireless environment, there are some disadvantages which characterize such a system. First, the system in FIG. 2 uses a combination of wireless signaling protocol and media gateway control protocol (MGCP). A wireless signaling protocol may be used to handle mobile terminals and current MGCP protocol assumes that the mobile terminal is wired (at least fixed for the duration of a call). Hence, mobile terminal signaling cannot be sufficiently processed using MGCP protocol alone.

Second, the system uses two different protocols to handle wireless voice communication and other media communication. Whereas a signaling gateway can handle wireless communication, a media gateway cannot handle typical wireless functions, such as location registration of a mobile terminal, paging a mobile terminal, and processing handoff of mobile terminals from one base station to another during a conversation in the MGCP protocol.

Thus, the system in FIG. 2 requires the base station to have two functional protocol units to handle wireless signaling and multi-media transactions. Traditionally in the wireless network, an open interface specification is defined between base stations and an MSC. The MSC is a Call Agent-like entity that can handle the mobile terminal signaling. In CDMA wireless network, the TIA/EIA-634 specification defines the interface.

On the other hand, TIA/EIA-634 specification does not define the media control of the Internet protocol local access network (IP LAN). Because the TIA/EIA-634 specification assumes a circuit-based network, the media identifier is specified in terms of TDM circuit ID of a trunk line between a base station and the MSC. Thus, the wireless signaling protocol is also not sufficient to control the packet based media stream on an IP LAN.

In order to handle both wireless mobile terminal signaling and also media traffic of the wireless mobile terminal, it is necessary for the system in FIG. 2 to support both wireless signaling protocol as well as IP media control protocol. For example, in a CDMA network, TIA/EIA-634 and MGCP can be used for such purpose.

In the example illustrated in FIG. 2, protocol interfaces used between a Call Agent and a base station are based on a packet-based IP LAN. A problem typically arises when the wireless signaling protocol and the MGCP are used together between a Call Agent and a base station. A linkage (or mapping) between a call identifier in the wireless signaling protocol and a call identifier of the corresponding call for the same mobile terminal must be made dynamically during each call setup. Because mobile terminals tend to move around within a particular call coverage area, a static system mapping of call identifiers for a given terminal by a base station is not economically feasible.

Furthermore, TLA/EIA-634 protocol does not have a method to specify the traffic path on an IP LAN associated with a particular signaling call that it is handling. In a conventional circuit based network, TIA/EIA-634 uses 16 bit identification typically known as Circuit Identity Code (CIC) which defines a PCM multiplexer ID to handle traffic path for a signaling call associated with it. However, this is not adequate for the traffic path on an IP LAN because the PCM multiplexer is not present on IP LANs and MGCP does not have any method to associate the mobile terminal to the connection. Since MGCP typically deals with the fixed connection, MGCP does not describe mobile endpoints to set up the traffic connections to a call.

Thus, it is desirable to have a system and a method for transmitting CDMA calls including voice and data over a communication pathway with a higher bandwidth. It is further desirable to have a CDMA system that handles the transmission of calls, especially data calls, without the inherent difficulties of using a variety of transmission protocols for the same call. A need further exists for an improved and less costly system which improves efficiency, transmission rate, and time of calls between a mobile unit and a base station, between base stations and a BSC, and between adjacent base stations.

SUMMARY OF THE INVENTION

The present invention is directed to a system and a method for providing an enterprise in-building or campus-wide IP-based code division multiple access (CDMA) wireless system. The present invention is capable of handling both voice and data transmission over an internet protocol local access network (IP LAN) within the CDMA system without the inherent delays and signal quality degradation encountered by conventional CDMA systems.

Embodiments of the invention include a system for linking or mapping a call in TLA/EIA-634 specification with a corresponding media gateway control protocol (MGCP) connection. The present invention provides a virtual circuit identity code (VCIC) as a linkage between TLA/EIA-634 wireless signaling and media gateway control for a mobile terminal in a Call Agent to base station interface in a packet based network. VCIC includes a base station identifier and a virtual traffic path identifier (VTP id) to uniquely identify the traffic path with the enterprise network under a Call Agent.

The invention further includes an integrated wireless internet base station (WIBS) which is coupled to the internet and an existing networking infrastructure within an office building or campus. The wireless base station utilizes known ethernet transmission protocols to transmit data over an ethernet back-bone to various wireless communication devices within a building. The wireless base station further includes a call processing module which is capable of determining whether a call originating from or received by the base station and sent to or from a communication unit is either a voice or a data call.

The WIBS also integrates the base station control functions of the prior art to reduce call setups between a communication unit and the WIBSs, and call handoffs between multiple WIBS. The WIBS further provides two functional logical implementations of a signaling gateway and a media gateway for communicating to a Call Agent utilizing the TIA/EIA-634 protocol and MGCP protocol respectively.

The WIBS also includes an ethernet protocol interface module to enable it to communicate over the ethernet back-bone and the internet using known ethernet and IP protocols. Since the ethernet back-bone uses a communication protocol different from the communication units, data received by the base station is packetized during processing into a format compatible with the ethernet transmission protocol of the ethernet back-bone and also the internet.

The invention further includes a gateway which includes formatting logic to reformat data generated by the base station over the ethernet back-bone into a format compatible with the public switch network. A router is also coupled to the ethernet back-bone to allow the WIBS to send and receive data over the internet or an intranet.

The present invention further includes media processing logic which allows multiple WIBSs in the system to communicate with each other during a soft handoff of communications between a mobile unit and a WIBS. By enabling adjacent WIBSs to communicate during a soft handoff, the present invention reduces the time it takes to implement soft handoffs in a CDMA system and further reduces potential data loss due to such handoffs.

The present invention further provides an implementation advantage over the prior art by allowing inter-network communication between the wireless office communication system of the present invention and other mobile networks on the public land mobile network. The inter-networking communication of the present invention is implemented over an IP LAN using UDP/IP or TCP/IP via an ethernet interface to the ethernet back-bone of the system. The use of the ethernet interface is less costly than the prior art and further allows easy and flexible connectivity to existing in-office, building or campus networks.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to embodiments of the invention, examples of which are illustrated in the accompanying drawings. While the invention will be described in conjunction with the following embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The invention is directed to a system, architecture, subsystem and method to manage a wireless CDMA data communication in a way superior to the prior art. In accordance with an aspect of the invention, a base station allows CDMA call coverage within a building without requiring a dedicated and a lengthy end-to-end transmission.

In the following detailed description of the present invention, a system and method for a wireless internet protocol-based communication system is described. Numerous specific details are set forth in order to provide a thorough understanding of the present invention. However, it will be recognized by one skilled in the art that the present invention may be practiced without these specific details or with equivalents thereof.

Generally, an aspect of the invention encompasses providing an integrated wireless internet protocol based in-building or campus-wide CDMA communication system which provides a wide range of voice, data, video and other services in conjunction with a private branch exchange interfaced to the Public Switched Telephone Network (PSTN) and the Public Land Mobile Network (PLMN). The invention can be more fully described with reference to FIGS. 3 through 5.

Figure 1:
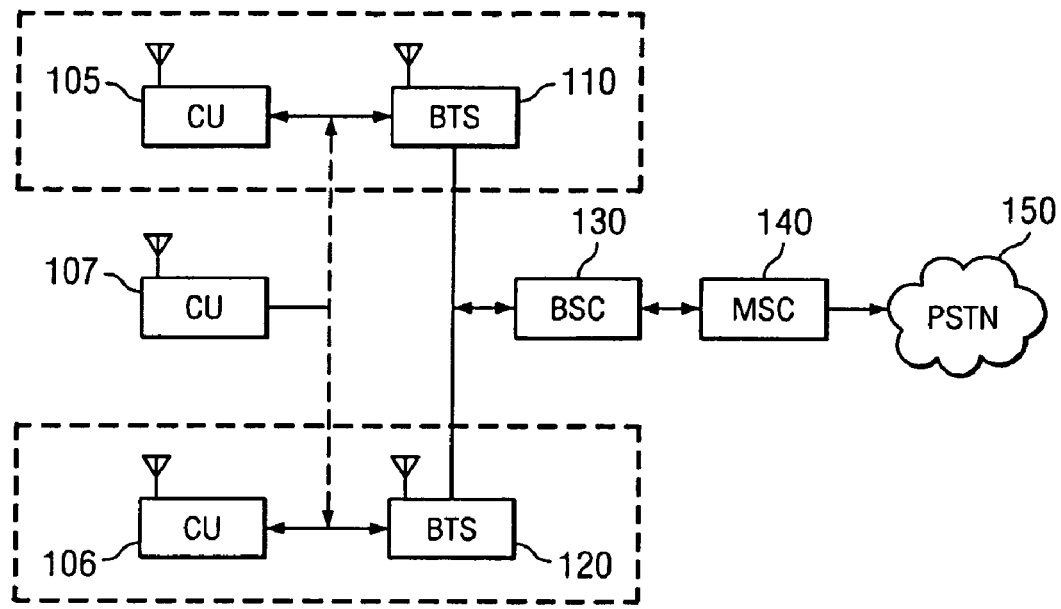
FIG. 1 is a block diagram of a conventional code division multiplex access (CDMA) system.
Figure 2:
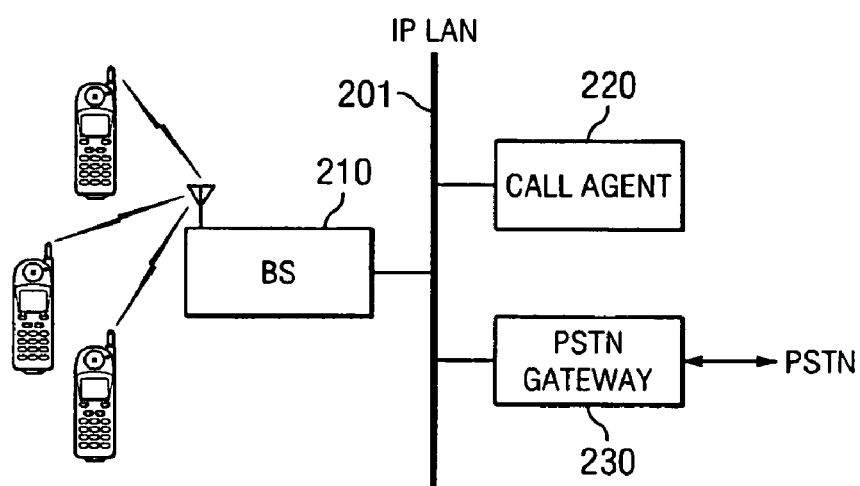
FIG. 2 is a block diagram of an implementation of a conventional enterprise CDMA system.
Figure 3:
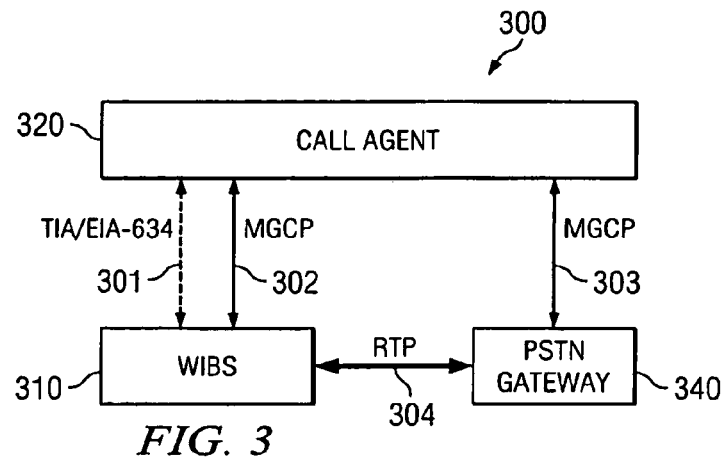
FIG. 3 is a block diagram of a CDMA network protocol interface on an internet protocol local area network (LAN)

FIG. 3 is a functional illustration of the wireless system of the present invention. Wireless Office Solution system 300 (WOS) comprises one or more mobile or wireless communication paths 301–303, an enterprise wireless base station (WIBS) 310, a Call Agent 320 coupled to an ethernet backbone of a LAN, and a PSTN gateway 340. Although the embodiment described above has been described with reference to one WIBS, the present invention is adaptable to handle one or more WIBSs. WOS 300 may be adapted to function with a code division multiplex access (CDMA) wireless technology. However, the present invention is adaptable equally to a time division multiple access (TDMA) system and other applicable wireless technologies.

Still referring to FIG. 3, WIBS 310 is an IP-based system that enables WOS 300 to take advantage of existing networking infrastructure in an office building or a similar environment to transmit wireless calls from the mobile units to other wireless devices on the network, to the internet, or to the PSTN. WIBS 310 includes switching functions to process traffic from various sources such as voice and data for delivery over the ethernet back-bone. Integration of BSC and MSC functions enables WIBS 310 to manage and coordinate radio resources to effect operations such as call origination, terminations and handoffs. WIBS 310 further provides an interface between a CDMA PCS or a cellular mobile communication system to enhance mobility within a wireless office environment. For example, WIBS 310 may cover hot spots or dead spots that traditional public cellular or PCS networks, such as on-campus network, could not address. Also WIBS 310 may help overcome problems due to load. WIBS 310 is coupled to the ethernet back-bone through a 10/100 base-T interface and related software stack to handle data bursts on the LAN that traditional CDMA systems could not handle. WIBS 310 receives and sends data to and from cellular regions to other subscription units in the WOS. WIBS 310 further receives radio signals from mobile units and packetizes the contents of the signals into data packets that are delivered over the ethernet back-bone to various destinations such as the PSTN and the internet.

Still referring to FIG. 3, WOS 300 further includes a wireless Call Agent 320 that couples to an ethernet backbone to provide call message handling to mobile units and other wireless devices coupled to a LAN. Call Agent 320 couples to WIBS 310 to provide mobile station controller functions to WIBS 310. In some embodiments, wireless communication signals transmitted between WIBS 310 and Call Agent 320 are adaptable to TIA/EIA-634 communication specifications and media gateway control protocol (MGCP) specification.

Call Agent 320 further communicates with WIBS 310 via a media gateway communication protocol signal line 302 to handle the transmission of media call functions between mobile units within WOS 300 and the public phone network system. In some embodiments, Call Agent 320 integrates mobile switch controller functionality to enable Call Agent 320 to manage calls received by WOS 300.

Referring still to FIG. 3, gateway 340 is coupled to an ethernet back-bone to receive converted voice signals with WOS 300 from WIBS 310 for delivery to the PSTN. In the present invention gateway 340 may be a PSTN or Trunk gateway manufactured by Cisco® systems.

Figure 4:
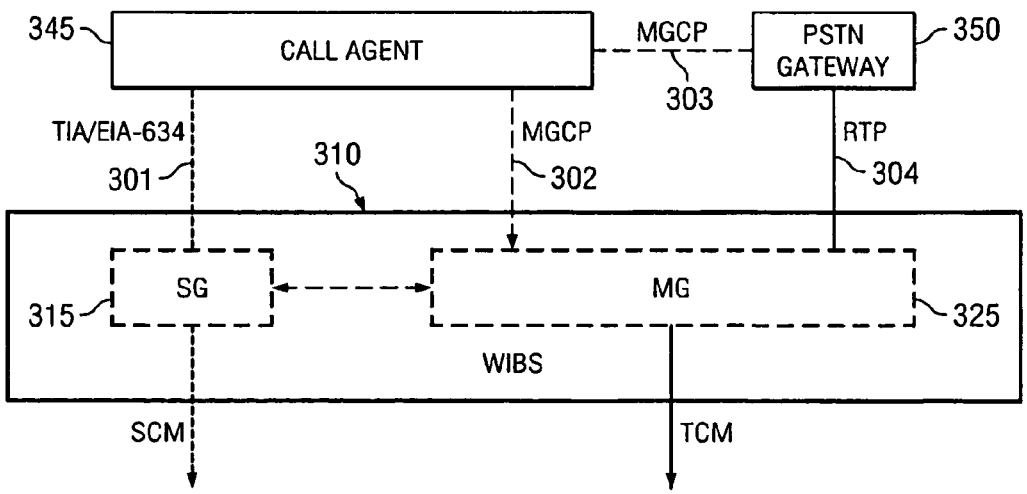
FIG. 4 is a block diagram of an embodiment of a wireless CDMA communication system of the present invention.

Referring to FIG. 4, a functional block diagram of the WIBS is illustrated in WIBS 310. The invention shown in FIG. 4 includes the WIBS 310, a Call Agent 345 and a PSTN gateway 350.

The WIBS 310 comprises a signaling gateway logic 315 and a media gateway logic 325. Signaling gateway logic 315 is coupled to the Call Agent 345 via TIA/EIA-634 signal path to provide communications between the mobile terminals and the Call Agent. Signal gateway logic 315 couples the WEBS 310 to the mobile terminals within the system via radio signaling channels. WIBS 310 further includes logic for creating a VTP for linking call signal identifiers from signaling gateway logic 315 to corresponding identifiers in media gateway logic 325.

Media gateway logic 325 also couples the WIBS 310 to mobile terminals via radio traffic channels and to PSTN gateway 350 via a Real-time transport protocol (RTP) signal path to provide a communication path between the WIBS 310 and the public network. Media gateway logic 325 further couples to the Call Agent 345 via MGCP path 302 to provide communication between WIBS 310 and the Call Agent utilizing the MGCP.

Media gateway logic 325 is designed to interface a media gateway controller and a media gateway. The protocol supports a centralized call model. The media gateway controller is a Call Agent in MGCP terminology and the media gateway can be either different types of voice-over IP (VoIP) gateways (residential, trunking, corporate), network access servers, or even voice over asynchronous transfer mode (ATM) gateways. MGCP is a master/slave protocol. It uses other protocols to fulfill its requirements, such as the session description protocol which is used to describe the media aspects of a phone call. Media gateway logic 325 provides WIBS 310 with VoIP functionality to enable WIBS 310 to support VoIP services over a LAN.

In the embodiment shown in FIG. 4, during the signal processing of mobile terminal's originated call or a land originated call, the signaling gateway logic 315 receives a request from Call Agent 345 to allocate the mobile to a dedicated traffic channel. The request includes the id of the VCIC that represents the id of the virtual traffic path of the call. Signal gateway logic 315 processes the request by requesting the media gateway logic 325 to allocate a traffic channel and passes the id of VCIC received from Call Agent 345. Media gateway logic 325 then sends commands to the mobile unit to start using the virtual traffic channel.

The VCIC includes a base station identifier and a VTP id which allows the WIBS 310 and Call Agent 345 to uniquely identify the VTP within the enterprise network under Call Agent 345. More specifically, the base station identifier is adapted to locate the media gateway, and the VTP id is adapted to locate a specific virtual path within the base station.

A traffic path is created between the base station and the mobile unit. The SG 315 responds to the Call Agent that the mobile is on a dedicated traffic channel. The Call Agent then sets up a media path between PSTN gateway 350 and media gateway logic 325. Setting up the media path by the media gateway logic 325 is performed using MGCP, and the Call Agent 345 invokes MGCP commands to media gateway logic 325. Since multiple calls are processed simultaneously, the Call Agent 345 may indicate in MGCP commands which mobile terminal the media stream (for example, an RTP stream) applies to.

Figure 5:
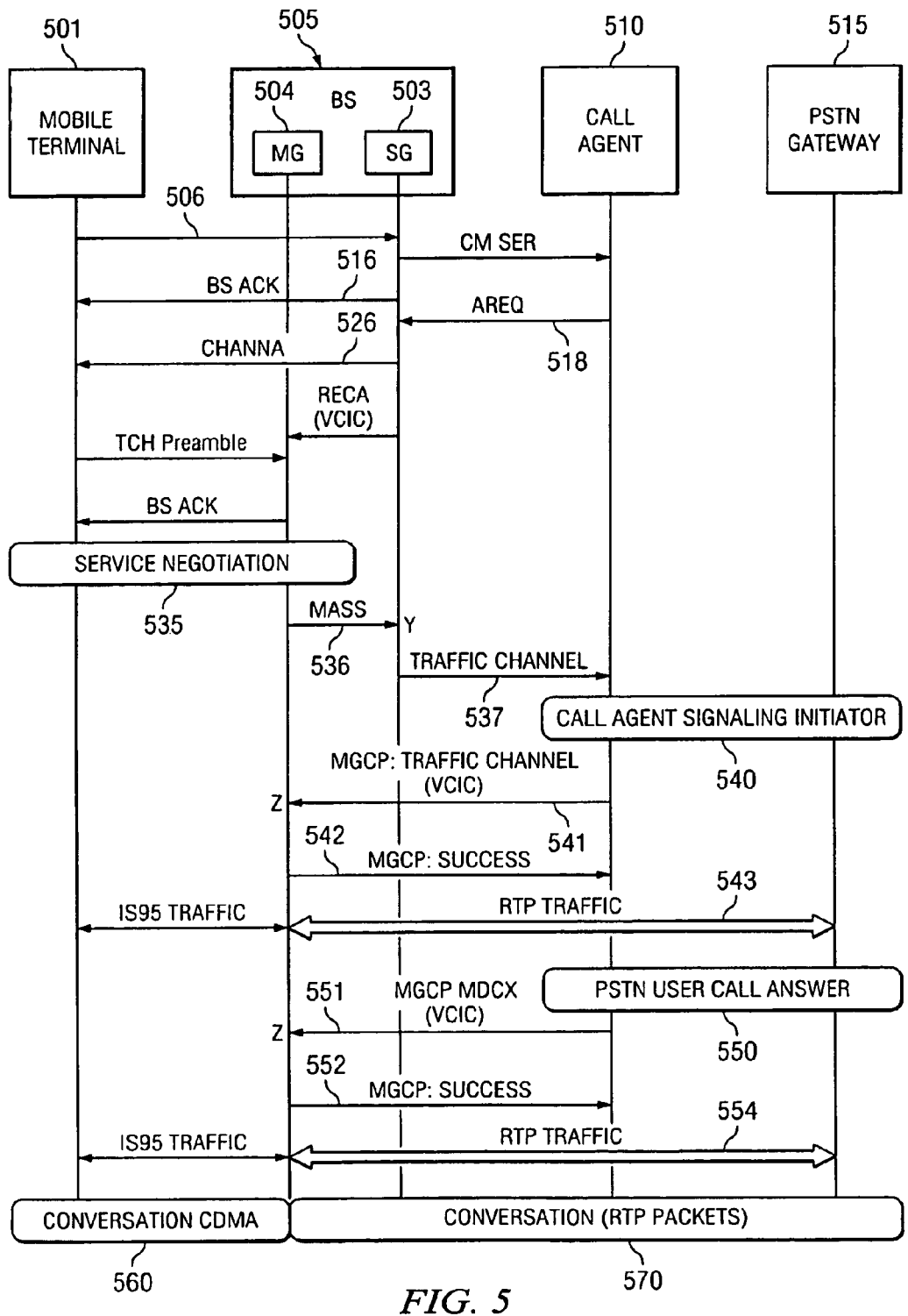
FIG. 5 is a block diagram of an embodiment of the call message flow of the present invention.

FIG. 5 is a block diagram illustrating one embodiment of a call message flow of the present invention. A call message in the present invention is initiated by mobile terminal 501 by sending a call origination signal 506 to base station 505. Signaling gateway 503 in base station 505 processes the call origination signal 506 and transmits a processed request to Call Agent 510.

The base station 505 then sends a signal receipt acknowledgment signal 516 to the mobile terminal 501 indicating the receipt and processing of the call origination request. After receiving the channel request from the signaling gateway 503, Call Agent 510 transmits a channel request signal 518 to the signal gateway 503 requesting allocation to the mobile station of a dedicated traffic channel. Channel request signal 518 includes the id of VCIC that represents the id of the traffic path of the call.

The signal gateway 503 then processes the channel request by requesting the media gateway 504 to allocate a traffic channel, passes the id of VCIC received from the Call Agent, and instructs the mobile terminal 501 to begin using the dedicated traffic channel using signal 526.

During this process, the traffic path between the base station 505 and the mobile terminal 501 is established subsequent to establishment of the mobile station and base station communication path. The signaling gateway 503 then responds to the Call Agent 510 that the mobile terminal 501 is on a dedicated traffic channel via traffic channel signal 537 (e.g., message Y).

Upon receiving the traffic channel signal 537, the Call Agent initializes the set up of a media communication pathway between PSTN gateway 515 and the media gateway 504 utilizing an MGCP hand-shake protocol via message signal 541 (Z) to enable the mobile terminal to begin transmitting to the PSTN. MG 504 then acknowledges receipt of message signal Z by transmitting a MGCP signal success signal via signal 542 from MG 504 to Call Agent signaling initiator 540. When the Call Agent signal initiator 540 receives signal 542, an RTP traffic path 543 is established to allow the mobile unit 501 to communicate with Call Agent 510.

Upon establishing the RTP path, PSTN user call answer 550 will start ringing at the PSTN end of the system. PSTN user call answer unit 550 then transmits a message signal 551 to the mobile unit 501 via service negotiator 535 utilizing the MGCP hand-shake protocol. The MGCP handshake protocol will include a VCIC code which establishes a VTP to allow the mobile unit 501 to communicate with the PSTN user answering a call from PSTN user call answer 550. Once a communication link is established between the mobile unit and PSTN user call answer 550, the mobile unit will begin transmitting via media signal line 554.

As shown in FIG. 5, the mobile unit 501 communicates to MG 504 using the TIA/EIA IS-95 traffic protocol, and MG 504 communicates messages received from mobile unit 501 to PSTN gateway 515 using MGCP protocol via signal 554.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. This thereby enables others skilled in the art to best utilize the invention and its embodiments with modifications which are suited to the particular use contemplated. It is intended that the scope of the invention be defined by the Claims appended hereto and their equivalents.

The invention claimed is:

1. A multi-protocol packet-based base station, comprising:
    a wireless signaling logic unit for handling communications with a mobile wireless device using wireless signals adapted for an internet protocol-based local area network;
    a media gateway logic unit adapted to handle communication signals for a media gateway control protocol (MGCP); and
    address generation logic for dynamically generating a virtual circuit identity code (VCIC) associated with the mobile wireless device for linking communication signals between said wireless signaling logic unit and said media gateway logic unit, the VCIC including a base station identifier and a virtual path identifier, wherein the VCIC enables signaling, with the mobile wireless device using a first protocol and with a remote endpoint using MGCP, for the establishment of a media communication session between the mobile wireless device and the remote endpoint, and wherein the VCIC enables identification of a traffic path used during the media communication session.

2. A multi-protocol enterprise code division multiplex access (CDMA) wireless communication system, comprising:
    a multi-protocol packet-based base station, wherein said base station includes:
        a wireless signaling logic unit for handling communications with a mobile wireless device using wireless signals adapted for an internet protocol-based local area network;
        a media gateway logic unit adapted to handle communication signals for a media gateway control protocol (MGCP); and
        address generation logic for dynamically generating a virtual circuit identity code (VCIC) associated with the mobile wireless device for linking communication signals between said wireless signaling logic unit and said media gateway logic unit, the VCIC including a base station identifier and a virtual path identifier, wherein the VCIC enables signaling, with the mobile wireless device using a first protocol and with a remote endpoint using MGCP, for the establishment of a media communication session between the mobile wireless device and the remote endpoint, and wherein the VCIC enables identification of a traffic path used during the media communication session;

a call agent; and mobile terminals adapted to communicate via multiple communication protocols.

3. The system of claim 2, wherein said VCIC creates a virtual traffic communication path to enable said base station to convert mobile signals between the first protocol type and MGCP.

4. The system of claim 3, wherein said first protocol type is a TLA/EIA-634 specification.

5. A method of handling wireless call messaging in a multi-protocol enterprise Code Division Multiplex Access (CDMA) system, comprising the steps of:

receiving a call message from a mobile communication unit, said call message transmitted via a first signal protocol;

processing said call message within a wireless base station within said CDMA system;

creating a virtual traffic communication path to transmit said call message within said CDMA system;

dynamically generating a virtual circuit identity code adaptable to both said first signal protocol and a second signal protocol, the virtual circuit identity code including a base station identifier and a virtual path identifier, wherein the virtual circuit identity code enables signaling with the mobile communication unit using said first signal protocol and with a destination wireless device using said second signal protocol, and wherein the virtual circuit identity code enables identification of the virtual traffic communication path; and transmitting said call message to the destination wireless device within said CDMA system, said call message transmitted via said second signal protocol.

6. A method of handling wireless call messaging in a multi-protocol enterprise Code Division Multiplex Access (CDMA) system, comprising the steps of:

receiving a call message from a mobile communication unit, said call message transmitted via a first signal protocol;

processing said call message within a wireless base station within said CDMA system;

creating a virtual traffic communication path to transmit said call message within said CDMA system;

providing a unique communication identifier responsive to said call message and correspondingly adaptable to a second signal protocol, the unique communication identifier including a base station identifier and a virtual path identifier, wherein the unique communication identifier enables signaling with the mobile communication unit using said first signal protocol and with a destination wireless device using said second signal protocol, and wherein the unique communication identifier enables identification of the virtual traffic communication path; and transmitting said call message to the destination wireless device within said CDMA system, said call message transmitted via said second signal protocol.

7. The method of claim 5, wherein said second signal protocol is adapted for a media control gateway.

8. The method of claim 6, wherein said second signal protocol is adapted for a media control gateway.

* * * * *